(12) United States Patent
Seo et al.

(10) Patent No.: US 7,760,989 B2
(45) Date of Patent: Jul. 20, 2010

(54) RECORDING MEDIUM HAVING DATA STRUCTURE INCLUDING GRAPHIC DATA AND RECORDING AND REPRODUCING METHODS AND APPARATUSES

(75) Inventors: Kang Soo Seo, Kyunggi-do (KR); Byung Jin Kim, Kyunggi-do (KR); Hyung Sun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1279 days.

(21) Appl. No.: 10/879,079

(22) Filed: Jun. 30, 2004

(65) Prior Publication Data

US 2005/0002650 A1   Jan. 6, 2005

(30) Foreign Application Priority Data

Jul. 1, 2003 (KR) ...................... 10-2003-0044206

(51) Int. Cl.
*H04N 5/00* (2006.01)
*H04N 7/00* (2006.01)
(52) U.S. Cl. .......................................... 386/95; 386/125
(58) Field of Classification Search .................. 386/46, 386/95, 125, 126
See application file for complete search history.

(56) References Cited

U.S. PATENT DOCUMENTS

| | | | |
|---|---|---|---|
| 4,439,759 A | 3/1984 | Fleming et al. |
| 5,539,716 A | 7/1996 | Furuhashi |
| 5,636,631 A | 6/1997 | Waitz et al. |
| 5,748,256 A | 5/1998 | Tsukagoshi |
| 5,758,007 A | 5/1998 | Kitamura et al. |
| 5,841,447 A | 11/1998 | Drews |
| 5,912,710 A | 6/1999 | Fujimoto |
| 5,917,830 A | 6/1999 | Chen et al. |
| 5,923,627 A | 7/1999 | Miwa et al. |
| 5,929,857 A | 7/1999 | Dinallo et al. |
| 5,963,704 A | 10/1999 | Mimura et al. |
| 5,999,160 A | 12/1999 | Kitamura et al. |
| 6,009,234 A | 12/1999 | Taira et al. |

(Continued)

FOREIGN PATENT DOCUMENTS

CN   1151586   6/1997

(Continued)

OTHER PUBLICATIONS

"Digital Video Broadcasting (DVB); Subtitling systems", Final Draft ETSI EN 300 743 V1.2.1 (Jun. 2002), ETSI, Jun. 2002.

(Continued)

*Primary Examiner*—Thai Tran
*Assistant Examiner*—Gelek Topgyal
(74) *Attorney, Agent, or Firm*—Harness, Dickey & Pierce

(57) ABSTRACT

The present invention relates to a recording medium having data structure including graphic data to be used for a menu page etc. of main video data recorded thereon as well as methods and apparatuses for reproducing and recording the data structure. A recording medium of the present invention comprises: a main data stream including at least video data; and a graphic data stream being used for composition of a menu screen for the recorded main data stream, wherein the graphic data stream includes at least one display set, the display set includes at least one composition segment and at least one data definition segment, and a presentation time stamp written in the composition segment is greater than a presentation time stamp written in the data definition segment.

39 Claims, 8 Drawing Sheets

U.S. PATENT DOCUMENTS

| | | | |
|---|---|---|---|
| 6,035,055 | A | 3/2000 | Wang et al. |
| 6,046,778 | A | 4/2000 | Nonomura et al. |
| 6,072,832 | A | 6/2000 | Katto |
| 6,088,507 | A | 7/2000 | Yamauchi et al. |
| 6,112,011 | A | 8/2000 | Hisatomi |
| 6,115,529 | A | 9/2000 | Park |
| 6,122,436 | A | 9/2000 | Okada et al. |
| 6,134,383 | A | 10/2000 | Kikuchi et al. |
| 6,167,189 | A | 12/2000 | Taira et al. |
| 6,167,192 | A | 12/2000 | Heo |
| 6,167,410 | A | 12/2000 | Imamura |
| 6,204,883 | B1 | 3/2001 | Tsukagoshi |
| 6,226,446 | B1 | 5/2001 | Murase et al. |
| 6,233,393 | B1 | 5/2001 | Yanagihara et al. |
| 6,246,402 | B1 | 6/2001 | Setogawa et al. |
| 6,246,790 | B1 | 6/2001 | Huang et al. |
| 6,286,001 | B1 | 9/2001 | Walker et al. |
| 6,330,210 | B1 | 12/2001 | Weirauch et al. |
| 6,335,742 | B1 | 1/2002 | Takemoto |
| 6,353,180 | B1 | 3/2002 | DeBartolo, Jr. et al. |
| 6,366,732 | B1 | 4/2002 | Murase et al. |
| 6,393,196 | B1 | 5/2002 | Yamane et al. |
| 6,433,801 | B1 | 8/2002 | Moon et al. |
| 6,445,877 | B1 | 9/2002 | Okada et al. |
| 6,470,460 | B1 | 10/2002 | Kashiwagi et al. |
| 6,483,983 | B1 | 11/2002 | Takahashi et al. |
| 6,504,996 | B1 | 1/2003 | Na et al. |
| 6,539,166 | B2 | 3/2003 | Kawamura et al. |
| 6,553,180 | B1 | 4/2003 | Kikuchi et al. |
| 6,574,417 | B1 | 6/2003 | Lin et al. |
| 6,707,459 | B1 | 3/2004 | Graves et al. |
| 6,711,287 | B1 | 3/2004 | Iwasaki |
| 6,724,981 | B1 | 4/2004 | Park et al. |
| 6,728,477 | B1 | 4/2004 | Watkins |
| 6,792,154 | B1 | 9/2004 | Stewart |
| 6,847,777 | B1 | 1/2005 | Nakamura |
| 6,850,228 | B1 | 2/2005 | Parks et al. |
| 6,871,008 | B1 | 3/2005 | Pintz et al. |
| 6,889,001 | B1 | 5/2005 | Nikaido et al. |
| 7,072,401 | B2 | 7/2006 | Kim et al. |
| 7,167,637 | B2 * | 1/2007 | Mori et al. .................. 386/125 |
| 7,236,687 | B2 | 6/2007 | Kato et al. |
| 2001/0036322 | A1 | 11/2001 | Bloomfield et al. |
| 2001/0052127 | A1 | 12/2001 | Seo et al. |
| 2002/0006165 | A1 | 1/2002 | Kato |
| 2002/0006273 | A1 | 1/2002 | Seo et al. |
| 2002/0089516 | A1 | 7/2002 | Sobol |
| 2002/0174430 | A1 | 11/2002 | Ellis et al. |
| 2002/0194618 | A1 | 12/2002 | Okada et al. |
| 2003/0152365 | A1 | 8/2003 | Nagayama |
| 2003/0179900 | A1 | 9/2003 | Tian et al. |
| 2004/0047591 | A1 | 3/2004 | Seo et al. |
| 2006/0045481 | A1 | 3/2006 | Yahata et al. |
| 2006/0064071 | A1 | 3/2006 | Sull et al. |
| 2006/0143666 | A1 | 6/2006 | Okada et al. |
| 2006/0153535 | A1 | 7/2006 | Chun et al. |
| 2006/0165388 | A1 * | 7/2006 | Uesaka et al. ............... 386/125 |
| 2006/0188223 | A1 * | 8/2006 | Ikeda et al. .................. 386/95 |
| 2006/0282775 | A1 | 12/2006 | Yahata et al. |
| 2007/0057969 | A1 | 3/2007 | McCrossan et al. |
| 2007/0133948 | A1 | 6/2007 | Kikuchi et al. |

FOREIGN PATENT DOCUMENTS

| | | |
|---|---|---|
| CN | 1156377 | 8/1997 |
| CN | 1167311 | 12/1997 |
| CN | 1103102 | 3/1998 |
| CN | 1242575 | 1/2000 |
| CN | 1251461 | 4/2000 |
| CN | 101026775 A | 8/2007 |
| CN | 1745579 | 3/2008 |
| EP | 0782338 | 7/1997 |
| EP | 0831647 | 3/1998 |
| EP | 0724264 | 12/1998 |
| EP | 0898279 | 2/1999 |
| EP | 0913822 | 5/1999 |
| EP | 1 021 048 | 7/2000 |
| EP | 1223580 | 7/2002 |
| EP | 1608165 | 12/2005 |
| EP | 1868190 | 12/2007 |
| JP | 6319125 | 11/1994 |
| JP | 8298554 | 11/1996 |
| JP | 8329004 | 12/1996 |
| JP | 8339663 | 12/1996 |
| JP | 10-215409 | 8/1998 |
| JP | 11018048 | 1/1999 |
| JP | 11185463 | 7/1999 |
| JP | 11298860 | 10/1999 |
| JP | 2000-083216 | 3/2000 |
| JP | 2000-100073 | 4/2000 |
| JP | 2000-132953 | 5/2000 |
| JP | 2000-222861 | 8/2000 |
| JP | 2000-261802 | 9/2000 |
| JP | 2001-184839 | 7/2001 |
| JP | 2001-312880 | 11/2001 |
| JP | 2002-056651 | 2/2002 |
| JP | 2002-067533 | 3/2002 |
| JP | 2002-153684 | 5/2002 |
| JP | 2002-344805 | 11/2002 |
| JP | 2003-009096 | 1/2003 |
| KR | 1994-0016014 | 3/1997 |
| KR | 1996-0025645 | 8/1997 |
| KR | 2001-0111247 | 12/2001 |
| KR | 2002-0064463 | 8/2002 |
| RU | 2129758 | 4/1999 |
| RU | 2323489 | 4/2008 |
| WO | WO 00/30357 | 5/2000 |
| WO | WO 00/30358 | 5/2000 |
| WO | WO 00/31980 | 6/2000 |
| WO | WO 00/36600 | 6/2000 |
| WO | WO 00/60598 | 10/2000 |
| WO | WO 2004/098193 | 11/2004 |
| WO | WO 2004/114658 A1 | 12/2004 |
| WO | WO 2005/002220 A1 | 1/2005 |
| WO | WO 2005/052941 A1 | 6/2005 |
| WO | WO 2005/078727 A1 | 8/2005 |

OTHER PUBLICATIONS

Office Action for corresponding Chinese Application No. 20040018832.0 dated Aug. 1, 2008 and English Translation.
Peter A. Sarginson; "MPEG-2: A Tutorial Introduction to the Systems Layers"; Jan. 1, 1995; pp. 4/1-413, XP006529329.
"Digital Video Broadcasting (DVB); Subtitling systems; Final draft ETSI EN 300 743"; ETSI Standards, LIS, Sophia Antipolis Cedex, France, vol. BC, No. V1.2.1, Jun. 1, 2002; XP014001876; ISSN 0000-0001.
European Search Report dated Sep. 1, 2008—04737126.5.
European Search Report dated Sep. 1, 2008—04748368.0—2223.
Chinese Office Action dated Aug. 1, 2008—Application No. 200480018833.5.
Notice of Allowance for Russian patent application No. 2006102853/28 dated Jun. 22, 2009.
U.S. Office Action dated Oct. 14, 2009 for U.S. Appl. No. 10/880,645.
Yahata et al., U.S. Appl. No. 60/483,228 dated Jun. 30, 2003.
English translation of Office Action dated May 5, 2008 for counterpart Russian Application No. 2005132412/28(036320).

* cited by examiner

FIG. 1
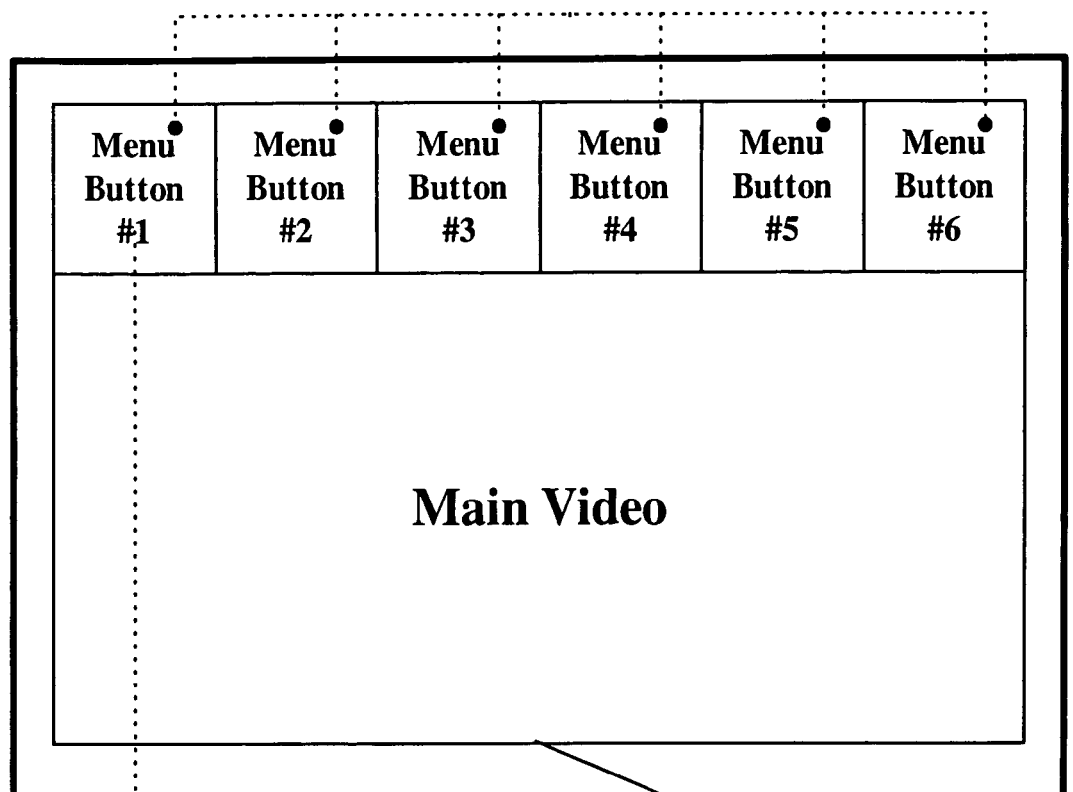
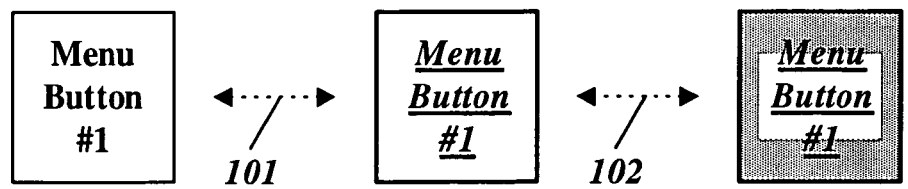

FIG. 3

Interactive Compostion Segment Syntax

```
Interactive_page_composition_segment ( ) {
        sync_byte
        segmet_type
        reserved
        segment_length
        page_time_out_pts
        selection_time_out_pts
        UO_mask
        page_version_number
        page_state
        ref_to_CLUT_id
        reserved_for_byte_align
        number_of_button_entries
        animation_frame_rate_code
        default_selected_button_number
        default_activated_button_number
        number_of_windows (//number_of_windows <=99)
        for (window_id=0; window_id < number_of_windows;i++){
                        window_horizontal_address
                        window_vertical_address
                        window_width
                        window_height
        }
        for (i=0; i < number_of_button_entries; i++){
                        button_number
                        numberically_selectable_flag
                        auto_action_falg
                        reserved
                        neighbour_info () {
                                    upper_button_number
                                    lower_button_number
                                    left_button_number
                                    right_button_number
                        }
                        normal_state_info(){
                                    start_object_id_normal
                                    end_object_id_normal
                                    repeat_normal_flag
                        }
                        selected_state_info(){
                                    start_object_id_selected
                                    end_object_id_selected
                                    repeat_selected_flag
                        }
                        actioned_state_info(){
                                    start_object_id_activated
                                    end_object_id_activated
                                    repeat_actioned_flag
                        }
                        num_of_button_commands
                        for(command_id=0;
                            command_id < num_of_button_commands;
                            command_id ++) {
                        }          button_command_id ++) {
        }
}
```

FIG. 4
CLUT_Definition Segment_Syntax

```
CLUT_definition_segment () {
        sync_type
        segment_type
        reserved
        segment_length
        CLUT_id
        reserved
        for (color_index=0; color_index <256; color_index++)
                CLUT_entry_id
                Y-value
                Cr-value
                Cb-value
                T-value
                }
        }
}
```

FIG. 5
Object Definition Segment_Syntax

```
Object_definition_segment ( ) {
        sync_byte
        segment_type
        reserved
        segment_length
        last_in_sequence
        reserved
        object_data_piece ( ) {
                object_id
                reserved
                object_width
                object_height
                do{ run_length_code
                    } while (run_length_code ! = '00000000 0000000 '
        }
}
```

FIG. 6
End of Display set Segment_Syntax

```
end_of_display_set_segment () {
        sync_byte
        segment_type
        reserved
        segment_length
}
```

FIG. 10

Page Compostion Segment Syntax

```
page_composition_segment () {
        sync_byte
        segment_type
        reserved
        segment_length
        page_time_out
        page_version_number
        page_state
        ref_to_CLUT_id
        reserved
        number_of_object_entries
        if (i=0; i<unmber_of_object_entries; i++) {
                ref_to_object_id
                is_object_crpping
                ref_to_window_id
                object_horizontal_address
                object_verticall_address
                if (is_object_cropping) {
                        object_horizontal_cropping
                        object_verticall_cropping
                        object_cropping_width
                        object_cropping_height
                }
        }
}
```

US 7,760,989 B2

RECORDING MEDIUM HAVING DATA STRUCTURE INCLUDING GRAPHIC DATA AND RECORDING AND REPRODUCING METHODS AND APPARATUSES

The present invention claims priority under 35 U.S.C. 119 on Korean Application No. 10-2003-044206 filed Jul. 1, 2003; the contents of which are incorporated by reference in their entirety.

BACKGROUND OF THE INVENTION

1. Field of the Invention

The present invention relates to a recording medium having data structure including graphic data to be used for a menu page etc. of main video data recorded thereon as well as methods and apparatuses for reproduction and recording the data structure.

2. Description of the Related Art

High-density optical disks such as DVDs (Digital Versatile Disk) capable of storing large amounts of high-quality digital video/audio data have been widely used. In addition, optical disk apparatuses using the DVD, for example, DVD players or DVD recorders are also widely used.

In general, the DVD includes subtitle data such as caption or logo as well as main video data recorded thereon. The subtitle data, which is graphic data, is presented along with the main video data. That is, the optical disk apparatus reads main video data and subtitle data and combines them to successive video frames where subtitle data is overlapped. The successive video frames are displayed onto an external displaying apparatus, e.g., a television set. Consequently, a user can view main video reproduced from the DVD with captions or logos of subtitle data.

In the meantime, an optical disk with higher density than the DVD is being standardized among related companies. A BD-ROM (Blu-ray Disk ROM) is an example of the higher-density optical disk. The BD-ROM also needs auxiliary graphic data to be used for selection of reproduction control and/or for additional information display besides main video data recorded thereon. Therefore, how to record such auxiliary graphic data to ensure its effective display to a user in reproduction is an issue in the standardization.

SUMMARY OF THE INVENTION

It is an object of the present invention to provide a recording medium having auxiliary graphic data whose recording structure is to ensure user-friendly display thereof, and methods and apparatuses for recording and reproducing the graphic data on such a recording medium.

A recording medium having recorded graphic data structured according to the present invention, comprises: a main data stream including at least video data; and a graphic data stream being used for graphic presentation for the recorded main data stream, wherein the graphic data stream includes at least one display set, the display set includes at least one composition segment and at least one data definition segment, and a presentation time stamp written in the composition segment is greater than a presentation time stamp written in the data definition segment.

Another recording medium having recorded graphic data structured according to the present invention, comprises: a main data stream including at least video data; and a graphic data stream being used for graphic presentation for the recorded main data stream, wherein the graphic data stream includes at least one composition segment and a plurality of data definition segments, each of the segments is corresponding to a single PES (Packetized Elementary Stream) packet, and a presentation time stamp written in a PES packet of the composition segment is not smaller than a presentation time stamp written in another PES packet of a last data definition segment among the plurality of data definition segments.

In one embodiment, the composition segment is interactive composition segment to be used for composition of menu screens.

In another embodiment, a presentation time stamp of the composition segment is greater than a presentation time stamp of a first object definition segment among the plurality of object definition segments.

In yet another embodiment, a presentation time stamp of the composition segment is not smaller than a presentation time stamp of a last object definition segment among the plurality of object definition segments.

The present invention further provides apparatuses and methods for recording and reproducing the data structure of graphic data according to the present invention, and recording and reproducing according to the present invention.

BRIEF DESCRIPTION OF THE DRAWINGS

The above features and other advantages of the present invention will be more clearly understood from the following detailed description taken in conjunction with the accompanying drawings, in which:

FIG. 1 shows an example of displayed screen where interactive graphic data is presented;

FIG. 3 shows syntax of an interactive composition segment;

FIG. 4 shows syntax of a color look-up table definition segment;

FIG. 5 shows syntax of an object definition segment;

FIG. 6 shows syntax of a display set end segment;

FIG. 10 shows syntax of a page composition segment.

DETAILED DESCRIPTION OF THE PREFERRED EMBODIMENTS

In order that the invention may be fully understood, exemplary embodiments thereof will now be described with reference to the accompanying drawings.

The data structures according to the present invention comprise navigation information for managing presentation of auxiliary graphic data recorded on the recording medium.

The data structures writing according to the present invention may be applicable to the manufacturing process in case of a read-only disk like BD-ROM.

The auxiliary graphic data is recorded on a recording medium in accordance with the present invention besides main video data. There are two types of the auxiliary graphic data. One type is presentation graphic data for embodying ordinary graphics such as subtitles and the other is interactive graphic data to compose menu pages etc. for user interfacing. The basic syntactic element of the graphic data is called 'Segment' that is corresponding to a single PES (Packetized Elementary Stream) packet. Some segments are grouped to a display set that will compose a completed screen of graphics called 'Display Update'.

FIG. 1 shows an example of displayed screen where interactive graphic data is presented. The display example of FIG. 1 is presented by processing an ICS (Interactive Composition Segment) having at least one menu page including information on six menu buttons. An image for each button is written in an ODS (Object Definition Segment). Because the menu button information in ICS has ID of an associated object, an object in ODS whose ID is designated by the menu button information is presented as the button. In addition, the menu button information has different object IDs for different states of same button, so that different images can be displayed for different states of same button (101,102).

Figure 2A:
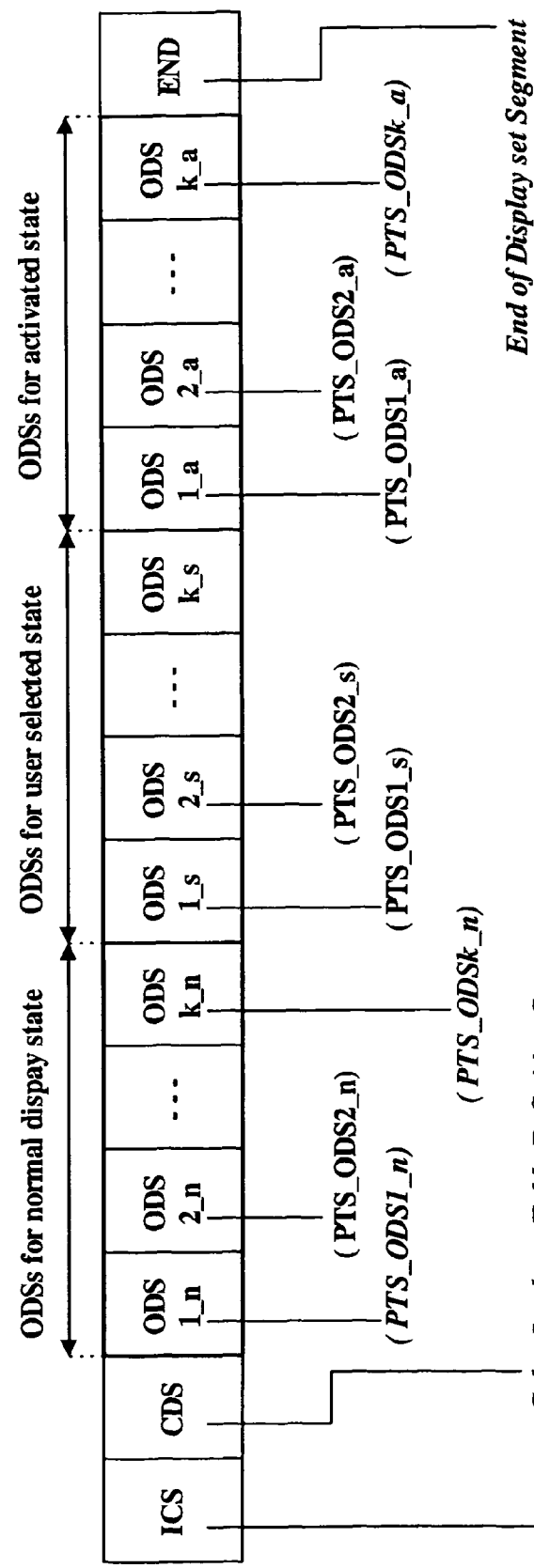
FIG. 2A illustrates a data structure of interactive graphic data, which will be displayed like FIG. 1, recorded on a recording medium in accordance with the present invention.

FIG. 2A illustrates a data structure of graphic data recorded on a recording medium in accordance with the present invention. The data structure of FIG. 2A will be displayed later as shown in FIG. 1. In the data structure of FIG. 2A, the first segment is ICS that includes information about menu pages and all buttons included in the pages, the second is CDS (Color lookup table Definition Segment) that defines palette for graphic planes, and successive ODSs follow the CDS. Each ODS includes information and actual graphic data for objects, e.g., buttons to be displayed on menu pages. The last object is END (End of Display set segment) to indicate the end of a display set. The plurality of ODSs may be arranged in order of normal, selected, and activated state as illustrated in FIG. 2A.

Figure 2B:
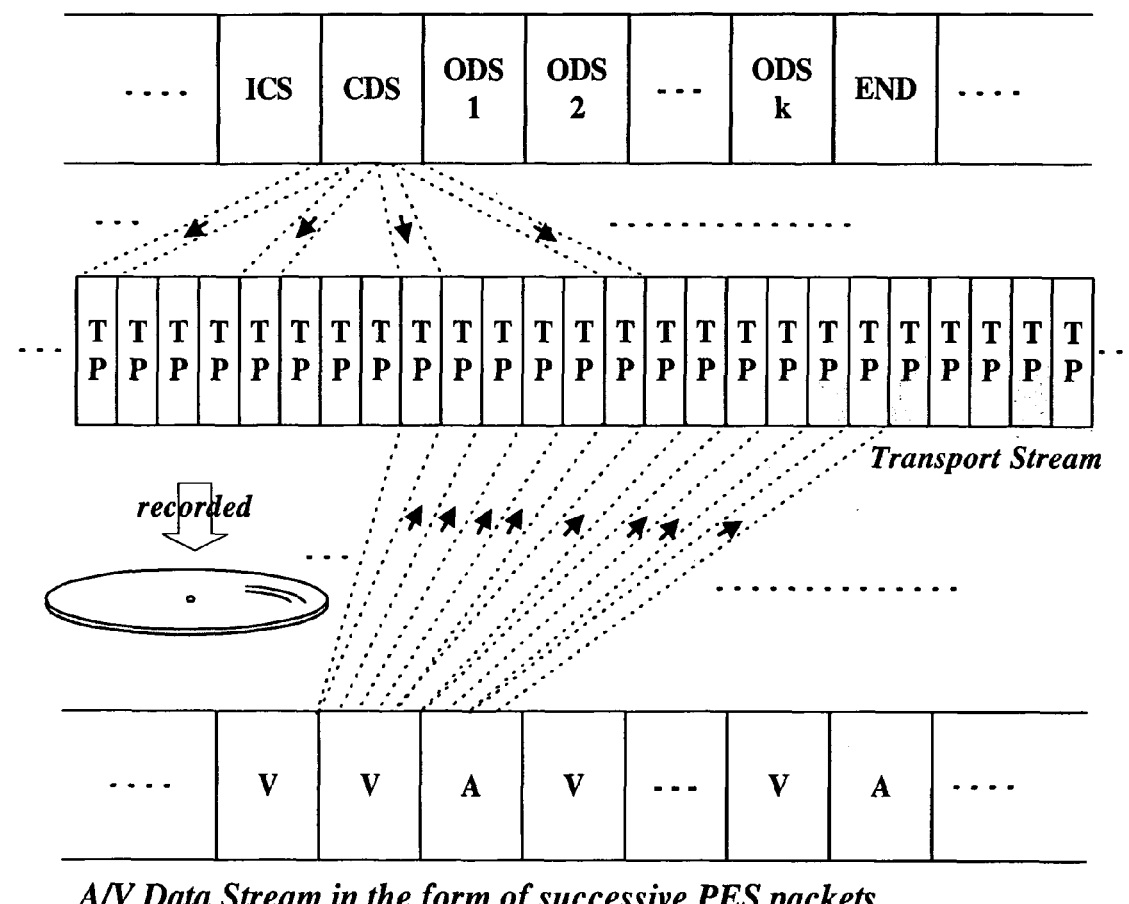
FIG. 2B shows schematic recording scheme of a main video data stream and an auxiliary graphic data stream.

The graphic data structured as shown in FIG. 2A in accordance with the present invention is interleaved with main video data on a recording medium as illustrated in FIG. 2B. For such interleaving, a series of PES packets constituting the graphic data stream and another series of PES packets constituting the main video data stream are all sliced and then every slice is packetized to a transport packet. Then, the transport packets of the main video data and the graphic data are multiplexed and recorded on a recording medium.

Each source packet, namely, each PES packet corresponding to each segment has PTS (Presentation Time Stamp) in its header to be used for presentation time control and DTS (Decoding Time Stamp) in its header to be used for decoding time control. By the way, the PTS to be written in each PES packet is subject to the following condition in accordance with the present invention.

The PTS 'PTS_ICS' in a PES packet of ICS must be greater than the PTS 'PTS_ODS1_n' in a PES packet of the first ODS 'ODS 1_n' that will be decoded first among ODSs. This condition is to ensure that ICS is processed after graphic data of at least the first ODS is decoded and then buffered.

The PTS of ICS may be smaller than the PTS 'PTS_ODSk_n' of the last ODS in normal-state ODSs which will be displayed last in the display set or smaller than PTS 'PTS_ODSk_a' of the last ODS in the display set, namely, the last ODS 'ODS k_a' that includes image data for the activated-state objects.

If the PTS in a PES packet corresponding to the ICS is greater than PTS in another PES packet of the first ODS, namely PTS_ICS>PTS_ODS 1_n, and is smaller than PTS of another PES packet of the normal-state last ODS 'ODS k_n', namely, PTS_ICS<PTS_ODSk_n, an optical disk apparatus being capable of reproducing the auxiliary graphic data recorded as above can display a menu page including at least one menu button because there is a bitmapped menu button image already decoded from an ODS whose PTS precedes the ICS when the ICS is processed.

If the PTS in a PES packet corresponding to the ICS is equal to or greater than PTS in another PES packet of the last ODS 'ODS k_a', the optical disk apparatus can display a menu page including all menu buttons at a time because all the bitmapped menu button images have been decoded from ODSs (ODS 1_n, ODS 2_n, . . . , ODS k_n, . . . , ODS_k_a) and are ready when the ICS is processed.

Consequently, a complete menu screen including necessary all menu buttons can be provided for a user very rapidly.

On the other hand, the PTS 'in a PES packet corresponding to the ICS is equal to or greater than PTS 'PTS_ODSk_n' in another PES packet of the normal-state last ODS 'ODS k_n' or is equal to or greater than PTS 'PTS_ODSk_s' in another PES packet of the selected-state last ODS 'ODS k_s'.

The ICS has the syntactic structure shown in FIG. 3. The ICS includes table elements such as page time-out PTS 'page_time_out_pts', selection time-out PTS 'selection_time_out_pts', and CLUT (Color Look_Up Table) ID 'ref_to_CLUT_id' to point to an associated CLUT.

The ICS also has information on all buttons to be displayed onto its menu pages as given in FIG. 3. There are three types in the button information. The first type is for normal state, the second for selected state and the third for activated state. The normal state button information 'normal_state_info' includes ID of start object 'start_object_id_normal' and ID of end object 'end_object_id_normal'. The selected state button information 'selected_state_info' includes ID of start object 'start_object_id_selected' and ID of end object 'end_object_id_selected'. The activated state button information includes ID of start object 'start_object_id_activated' and ID of end object 'end_object_id_activated'.

If the IDs of start and end object are different each other, the objects from the start to the end inclusive are displayed sequentially to show animated display. The animation display rate is defined by the field of animation frame rate code 'animation_frame_rate_code'.

The CDS has the syntactic structure shown in FIG. 4. The CDS includes table elements such as sync byte 'sync_byte', type of segment 'segment_type', length of segment 'segment_length', ID of CLUT 'CLUT_id', and, for each color index, ID of CLUT entry 'CLUT_entry_id', luminance value 'Y-value', red-chrominance value 'Cr-value', blue-chrominance value 'Cb-value', and transparency value 'T-value'.

FIG. 5 shows the syntactic structure of the ODS. The ODS includes sync byte 'sync_byte', type of segment 'segment_type', length of segment 'segment_length', a plurality of object data pieces 'object_data_piece', and so on. Each of the object data pieces includes object ID 'object_id', width of an object 'object_width', height of an object 'object_height', and run-length code field 'run_length_code' where graphic data pertaining to object is encoded.

FIG. 6 shows the syntactic structure of the END. The END includes sync byte 'sync_byte', type of segment 'segment_type', and length of segment 'segment_length'.

Figure 7:
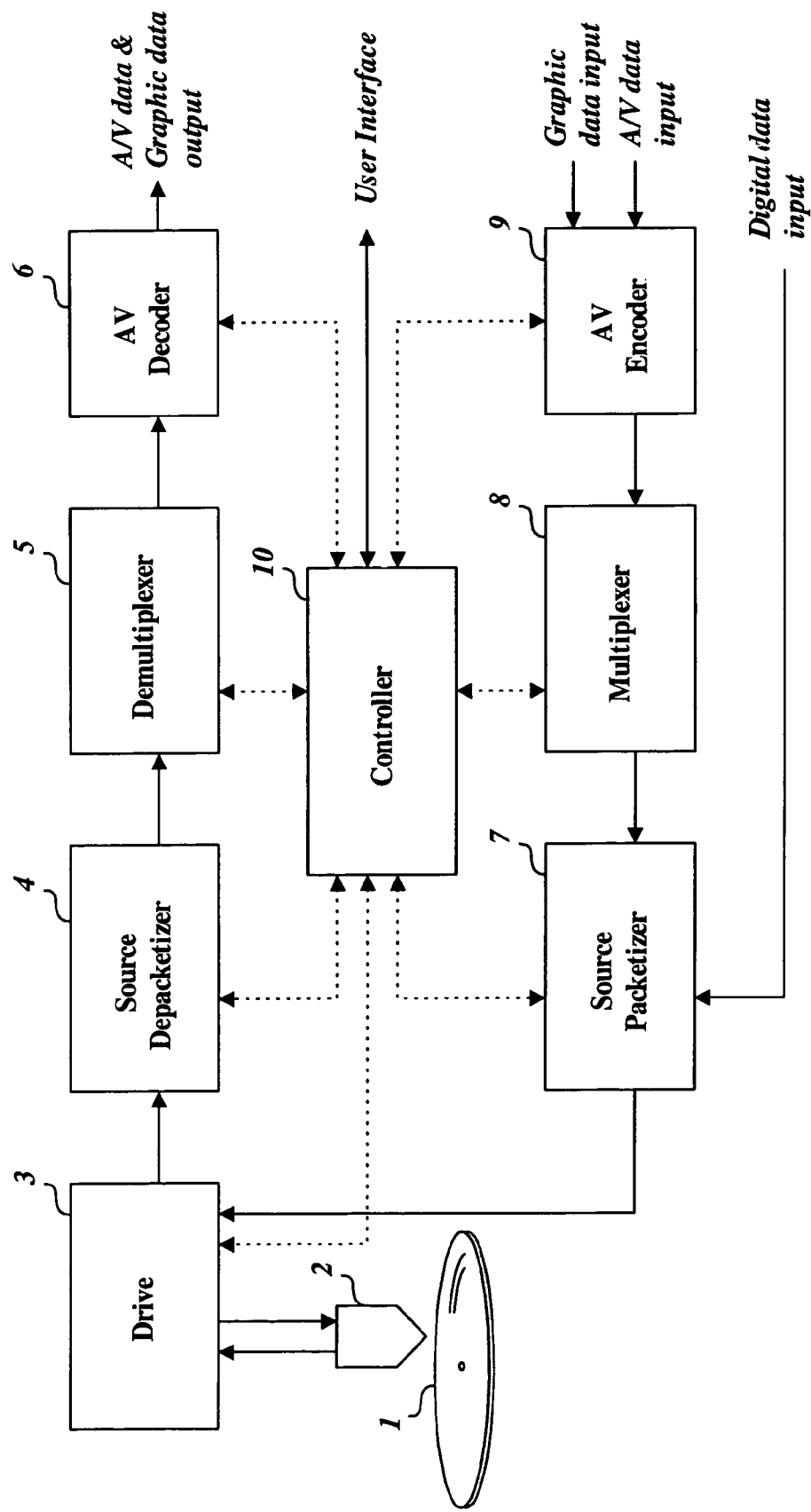
FIG. 7 illustrates a schematic diagram of an embodiment of an optical disk recording and reproducing apparatus according to the present invention.

FIG. 7 illustrates a schematic diagram of an embodiment of an optical disk recording and reproducing apparatus according to the present invention. As shown, an AV encoder 9 receives and encodes audio and video data and/or auxiliary graphic data. The AV encoder 9 outputs the encoded audio and video data along with coding information and stream attribute information. A multiplexer 8 multiplexes the encoded audio and video data and the graphic data based on the coding information and stream attribute information to create, for example, an MPEG-2 transport stream consisting of successive transport packets. A source packetizer 7 packetizes the transport packets from the multiplexer 8 into source packets in accordance with the audio/video format (and/or graphic data format) of the optical disk. As shown in FIG. 7, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type (A/V or graphic data) of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation information for managing reproduction of the audio/video data and graphic data being recorded on the optical disk. For example, based on information received via the user interface (e.g., instruction set saved on disk, provided over an intranet or internet by a computer system, etc.) the controller 10 controls the drive 3 to record necessary management data.

In addition, the controller 10 controls encoding process of the AV encoder 9 such that the graphic data is structured in FIGS. 2A and 2B and 3 to 6.

Especially, the controller instructs the AV encoder 9 to write PTSs in each header of encoded PES packets such that PTS for an ICS is equal to or greater than PTS for the normal-state last ODS 'ODS k_n', the selected-state last ODS 'ODS k_s', or the activated last ODS 'ODS k_a'.

In the process of reproduction, the controller 10 controls the drive 3 to reproduce this data structure from the optical disk. Based on the information contained therein, as well as user input received over the user interface (e.g., control buttons on the recording and reproducing apparatus or a remote associated with the apparatus), the controller 10 controls the drive 3 to reproduce the audio/video and/or graphic data source packets from the optical disk. For example, the user input may specify a title to reproduce from a title domain or a menu from menu domain. This user input may be specified, for example, via a menu based graphical user interface preprogrammed into the controller 10 or via menu buttons included in a menu composed by processing of a certain ICS at user's request. Using the user input and the navigation information reproduced from the optical disk, the controller 10 controls the reproduction of a title. For receiving the user inputs, the controller 10 reads and processes the auxiliary graphic data recorded on the optical disk to compose a menu screen, as explained above in detail.

The reproduced source packets are received by a source depacketizer 4 and converted into a data stream (e.g., an MPEG-2 transport stream). A demultiplexer 5 demultiplexes the data stream into encoded video and audio data and/or graphic data. An AV decoder 6 decodes the encoded data to produce the original audio and video data and/or graphic data that was feed to the AV encoder 9. The graphic data is processed when a menu is requested from a user. In the graphic data processing, normal state ODSs are decoded and stored in a buffer (not figured) before processing ICS because the normal state ODSs precede the IDS in PTS. A complete menu screen is composed with the already-decoded button images stored in the buffer by execution of the ICS. After processing the ICS, the controller 10 knows the relations among buttons and among menu pages and other button-related operation information. Therefore, the controller 10 can conduct an operation associated with a selected button or an execution-requested button. In the event that a button is selected or activated, an already-decoded graphic image of the button object in corresponding state ODS (ODS 1_s, . . . , ODS k_s, ODS 1_a, . . . , or ODS k_a) stored in the buffer replaces the normal state button image in the displayed menu page.

During the reproduction of audio/video data and graphic data, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform and on menu page composition, instructs the demultiplexer 5 on the transport stream to demultiplex, and instructs the source depacketizer 4 on the source packet format.

While FIG. 7 has been described as a recording and reproducing apparatus, it will be understood that only a recording or only a reproducing apparatus may be provided using those portions of FIG. 7 providing the recording or reproducing function.

Figure 8:
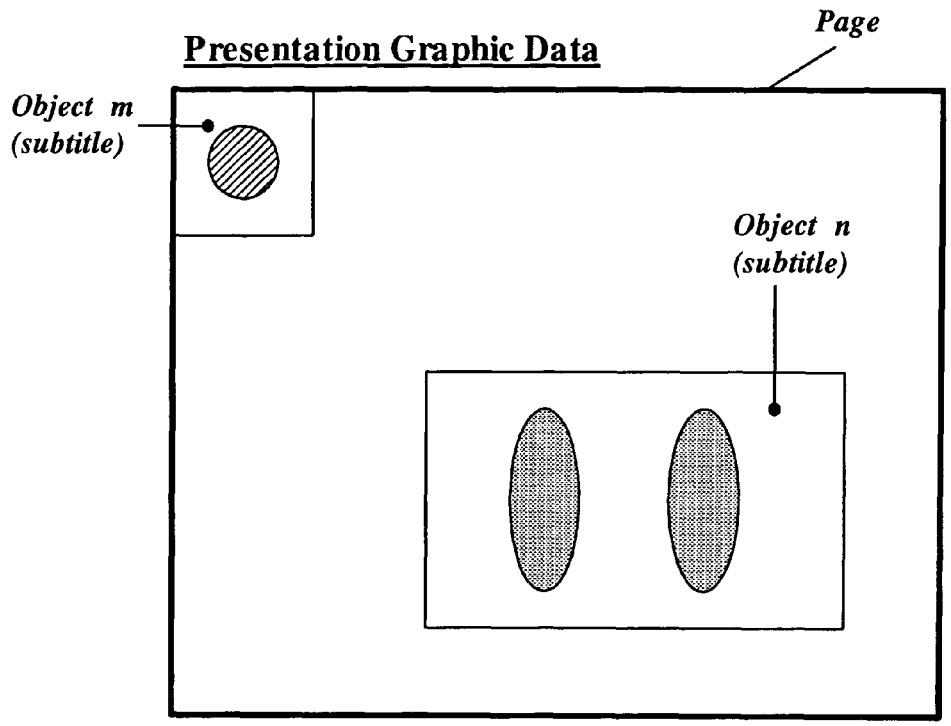
FIG. 8 shows an example of displayed screen where subtitle graphic data is presented.

In the meantime, the BD-ROM can store presentation graphic data to be used not for user interfacing but for information display. FIG. 8 illustrates such a graphic page.

In the display example of FIG. 8, two subtitle objects (Objects #m, #n) are displayed thereon. Information of the objects is included in a PCS (Page Composition Segment), color information therefor is included in a CDS, and bit-mapped images thereof is included in ODSs. In the page of FIG. 8, a video scene decoded from main video data reproduced from a BD-ROM may be displayed onto a screen area where the subtitle objects are not displayed.

Figure 9:
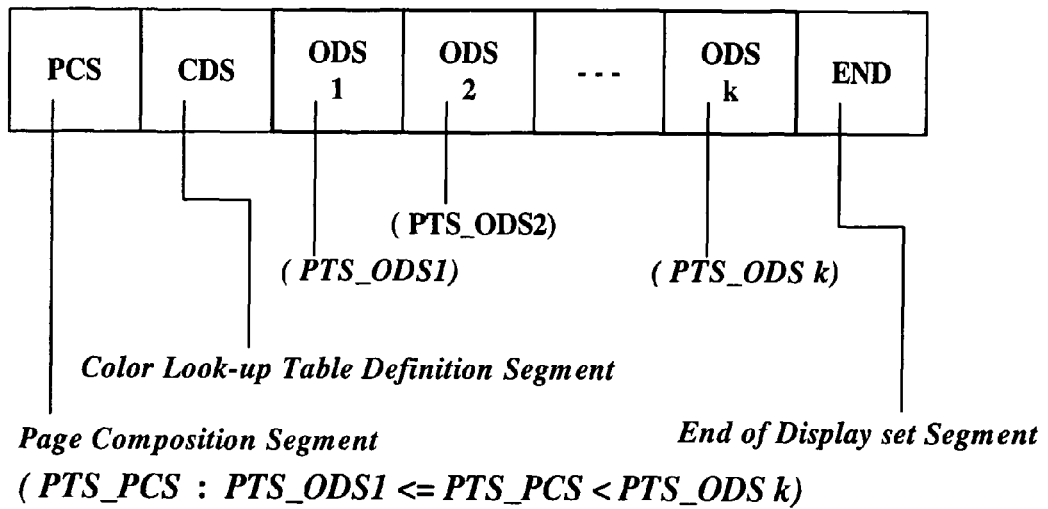
FIG. 9 illustrates a data structure of subtitle graphic data, which will be displayed like FIG. 8, recorded on a recording medium in accordance with the present invention.

FIG. 9 illustrates the structure of graphic data to compose a subtitle graphic page like FIG. 8. In the data structure of FIG. 9, the first segment is PCS that includes information for a graphic page and all objects to be included in the page, the second is CDS that defines palette for the graphic plane, and at least one ODS follows the CDS. Each ODS includes bit-mapped graphic data for the objects to be displayed on the subtitle graphic page. The last object is END (End of Display set segment) to indicate end of a display set.

Each source packet, namely, each PES packet corresponding to each segment has PTS (Presentation Time Stamp) to be used for presentation time control and DTS (Decoding Time Stamp) to be used for decoding time control. By the way, the PTS to be written in each PES packet is subject to the following condition in accordance with the present invention.

The PTS 'PTS_PCS' in a PES packet of PCS must be greater than the PTS 'PTS_ODS 1' in a PES packet of the first ODS that will be displayed first among ODSs. This condition is to guarantee that PCS is processed after graphic data of at least the first ODS is decoded and buffered.

If the PTS in a PES packet corresponding to the PCS is greater than PTS in another PES packet of the first ODS, namely PTS_PCS>PTS_ODS 1, and is smaller than PTS of another PES packet of the last ODS, namely, PTS_ICS<PTS_ODS k, the optical disk apparatus being capable of reproducing the auxiliary graphic data recorded as above can display a graphic page including at least one object image because there is bitmapped image data decoded from an ODS whose PTS precedes the PCS when the PCS is processed.

For example, if the PTS 'PTS_PCS' in a PES packet corresponding to the PCS is equal to PTS 'PTS_ODS 2' in another PES packet of the second ODS 'ODS 2', the optical disk apparatus can compose and display a graphic page specified by the PCS with decoded bitmapped object images the moment or just after the first and the second ODS (ODSs 1 and 2) are decoded.

The PCS has the syntactic structure shown in FIG. 10. The PCS includes table elements such as page time-out information 'page_time_out', page state information 'page_state', and CLUT ID 'ref_to_CLUT_id' to point to an associated CLUT. The PCS also includes other information fields for linking graphic objects in ODSs and their presentation control.

The above explanation about operation of the recording/reproducing apparatus given in FIG. 7 is also applicable to the data structures shown in FIGS. 9 and 10 except that a graphic page has graphic objects without interactive menu buttons.

The present invention, disclosed with respect to a limited number of embodiments, displays a graphic page, e.g. a menu page including at least one object image after reading graphic data recorded on a recording medium, whereby, a user can know easily and rapidly screen change from main video to graphic plane.

While the invention has been disclosed with respect to a limited number of embodiments, those skilled in the art, having the benefit of this disclosure, will appreciated numerous modifications and variations therefrom. It is intended that all such modifications and variations fall within the spirit and scope of the invention.

What is claimed is:

1. A recording medium having an executable data structure for managing reproduction of a data stream recorded thereon by a reproducing apparatus, comprising:
    a main data stream including at least video data; and
    a graphic data stream associated with the main data stream, the graphic data stream including at least one display set, each display set for a complete display of graphics, the display set including a composition segment and at least one data definition segment, the composition segment including management information for managing reproduction of graphic information provided by the at least one data definition segment, the data definition segment including object data referred to by the composition segment, the composition segment and the data definition segment each including a presentation time stamp,
    wherein the presentation time stamp of the composition segment within the display set is equal to or greater than the presentation time stamp written in a first data definition segment within display set and is smaller than the presentation time stamp written in a last data definition segment within the display set.

2. The recording medium of claim 1, wherein the composition segment includes information of a menu button to be displayed within a menu screen, and the data definition segment includes image data of the menu button.

3. The recording medium of claim 2, wherein the information of a menu button is for location and size of the menu button and for linked relation between the menu button and other buttons.

4. The recording medium of claim 2, wherein the information of a menu button includes an ID indicative of a button image included in the data definition segment.

5. The recording medium of claim 2, wherein button images of different states of a button are written in different data definition segments.

6. The recording medium of claim 1, wherein the display set further includes another segment having color control information for data images included in the data definition segment.

7. The recording medium of claim 1, wherein the main data stream and the graphic data stream are interleaved each other.

8. The recording medium of claim 1, wherein the presentation time stamp indicates one of when a segment is ready for presentation and when the segment is beginning presentation.

9. A recording medium having an executable data structure for managing the reproduction of a data stream recorded thereon by a reproducing apparatus, comprising:
    a main data stream including at least video data; and
    a graphic data stream associated with the main data stream, the graphic data stream including at least one display set, each display set for a complete display of graphics, the display set including a composition segment and at least one data definition segment, the composition segment including management information for managing reproduction of graphic information provided by the data definition segment, each of the segments to correspond to a single PES (Packetized Elementary Stream) packet,
    wherein a presentation time stamp written in a PES packet of the composition segment within the display set is equal to or greater than a presentation time stamp written in another PES packet of a first data definition segment among the at least one data definition segment within the display set and is smaller than a presentation time stamp written in another PES packet of a last data definition segment among the one or more data definition segments within the display set.

10. The recording medium of claim 9, wherein the composition segment includes information of menu buttons to be displayed within a menu screen, and the data definition segment includes image data of the menu buttons.

11. The recording medium of claim 9, wherein the display set further includes another segment having color control information for data images included in the data definition segment.

12. The recording medium of claim 9, wherein the graphic data stream further includes at least one composition segment and at least one data definition segment being used for composition of a subtitle graphic screen.

13. The recording medium of claim 9, wherein the at least one data definition segment includes image data of normal-state objects.

14. The recording medium of claim 9, wherein the at least one data definition segment includes image data of selected-state objects.

15. The recording medium of claim 9, wherein the at least one data definition segment includes image data of activated-state objects.

16. A method for recording a data structure including at least one data stream on a recording medium, comprising:
    generating a graphic data stream being used for main video data stream, the graphic data stream including at least one display set, each display set for a complete display of graphics, the display set including a composition segment and at least one data definition segment, a presentation time stamp written in the composition segment within the display set being equal to or greater than a presentation time stamp written in a first data definition segment within the display set and being smaller than a presentation time stamp written in a last data definition segment within the display set; and
    recording the generated graphic data stream together with the video data stream on the recording medium.

17. The method of claim 16, wherein the composition segment includes information of menu buttons to be displayed within a menu screen, and the data definition segment includes image data of the menu buttons.

18. The method of claim 16, wherein the display set further includes another segment having color control information for data images included in the data definition segment.

19. A method for recording a data structure including at least one data stream on a recording medium, comprising:
generating a graphic data stream being used for main data stream, the graphic data stream including at least one display set, each display set for a complete display of graphics, the display set including a composition segment and at least one data definition segment, each of the segments corresponding to a single PES (Packetized Elementary Stream) packet, a presentation time stamp written in a PES packet of the composition segment within the display set being equal to or greater than a presentation time stamp written in another PES packet of a first last data definition segment of the at least one data definition segment within the display set and being smaller than a presentation time stamp written in another PES packet of a last data definition segment among the one or more data definition segments within the display set; and
recording the generated graphic data stream together with the main data stream on the recording medium.

20. The method of claim 19, wherein the composition segment includes information of menu buttons to be displayed within a menu screen, and the data definition segment includes image data of the menu buttons.

21. The method of claim 19, wherein the composition segment and the definition segment are grouped to a display set to be composed to a complete screen.

22. The method of claim 19, wherein the presentation time stamp indicates one of when a segment is ready for presentation and when the segment is beginning presentation.

23. An apparatus for recording a data structure including at least graphic data stream on a recording medium, comprising:
a recording device configured to record data on the recording medium;
an encoder configured to encode the data; and
a controller configured to control the encoder to encode a graphic data stream to successive packets, the graphic data stream including at least one display set, each display set for a complete display of graphics, the display set including a composition segment and at least one data definition segment, each of the segments corresponding to a single packet, such that a presentation time stamp written in a packet pertaining to the composition segment within the display set is equal to or greater than a presentation time stamp written in another packet pertaining to a first data definition segment within the display set and is smaller than a presentation time stamp written in a last data definition segment within the display set, and configured to control the recording device to record the encoded graphic data stream on the recording medium.

24. The apparatus of claim 23, wherein each of the segments is organized to a single PES (Packetized Elementary Stream) packet.

25. The apparatus of claim 23, wherein the composition segment includes information of menu buttons to be displayed within a menu screen, and the data definition segment includes image data of the menu buttons.

26. The apparatus of claim 23, wherein the display set further includes another segment having color control information for data images included in the data definition segment.

27. The apparatus of claim 23, wherein the presentation time stamp indicates when a segment is ready for presentation or when the segment is beginning presentation.

28. An apparatus for recording a data structure including at least graphic data stream on a recording medium, comprising:
a recording device configured to record data on the recording medium;
a controller configured to control an encoder to encode a graphic data stream to successive packets, the graphic data stream including at least one display set, each display set for a complete display of graphics, the display set including a composition segment and at least one data definition segment, each of the segments corresponding to a single packet, such that a presentation time stamp written in a packet pertaining to the composition segment within the display set is equal to or greater than a presentation time stamp written in another packet pertaining to a first data definition segment of the at least one data definition segment within the display set and is smaller than a presentation time stamp written in another PES packet of a last data definition segment among the one or more data definition segments within the display set, and configured to control the recording device to record the encoded graphic data stream on the recording medium.

29. The apparatus of claim 28, wherein the composition segment includes information of menu buttons to be displayed within a menu screen, and the data definition segment includes image data of the menu buttons.

30. The apparatus of claim 28, wherein the composition segment and the definition segment are grouped to a display set to be composed to a complete screen.

31. The apparatus of claim 28, wherein the presentation time stamp indicates when a segment is ready for presentation or when the segment is beginning presentation.

32. A method for reproducing a data structure including at least graphic data stream recorded on a recording medium, comprising:
reading a graphic data stream from the recording medium, the graphic data stream including at least one display set for a complete display of graphics, the display set including a composition segment and at least one data definition segment, each of the segments to correspond to a single PES (Packetized Elementary Stream) packet; and
presenting the graphic data stream according to each presentation time information of each segment of the graphic data stream,
wherein a presentation time stamp written in a PES packet of the composition segment within the display set is equal to or greater than a presentation time stamp written in another PES packet of a first data definition segment of the at least one data definition segment within the display set and is smaller than a presentation time stamp written in another PES packet of a last data definition segment among the one or more data definition segments within the display set.

33. The method of claim 32, wherein the composition segment includes information of menu buttons to be displayed within a menu screen, and the data definition segment includes image data of the menu buttons.

34. The method of claim 32, wherein the composition segment and the data definition segment are grouped to a display set to be composed to a complete screen.

35. The method of claim 32, wherein the presentation time stamp indicates one of when a segment is ready for presentation and when the segment is beginning presentation.

36. An apparatus for reproducing a data structure including graphic data stream recorded on a recording medium, comprising:

reproducing device configured to reproduce graphic data stream recorded on the recording medium, the graphic data stream including at least one display set, each display set for a complete display of graphics, the at least one display set including a composition segment and at least one data definition segment, each of the segments to correspond to a single PES (Packetized Elementary Stream) packet; and a controller configured to control the reproducing device to reproduce the display set according to each presentation time stamp of each segment of the display set, wherein a presentation time stamp written in a PES packet of the composition segment within the display set is equal to or greater than a presentation time stamp written in another PES packet of a first data definition segment of the at least one data definition segment within the display set and is smaller than a presentation time stamp written in another PES packet of a last data definition segment among the one or more data definition segments within the display set.

37. The apparatus of claim 36, wherein the controller controls the reproducing device to reproduce the composition segment including information of menu buttons to be displayed within a menu screen, and the data definition segment includes image data of the menu buttons.

38. The apparatus of claim 36, wherein the controller controls the reproducing device to reproduce the composition segment and the data definition segment grouped to a display set to be composed to a complete screen.

39. The method of claim 36, wherein the presentation time stamp indicates one of when a segment is ready for presentation and when the segment is beginning presentation.

* * * * *